G. C. TAFT.
Metal Drill.
No. 16,900.
Patented March 24, 1857.
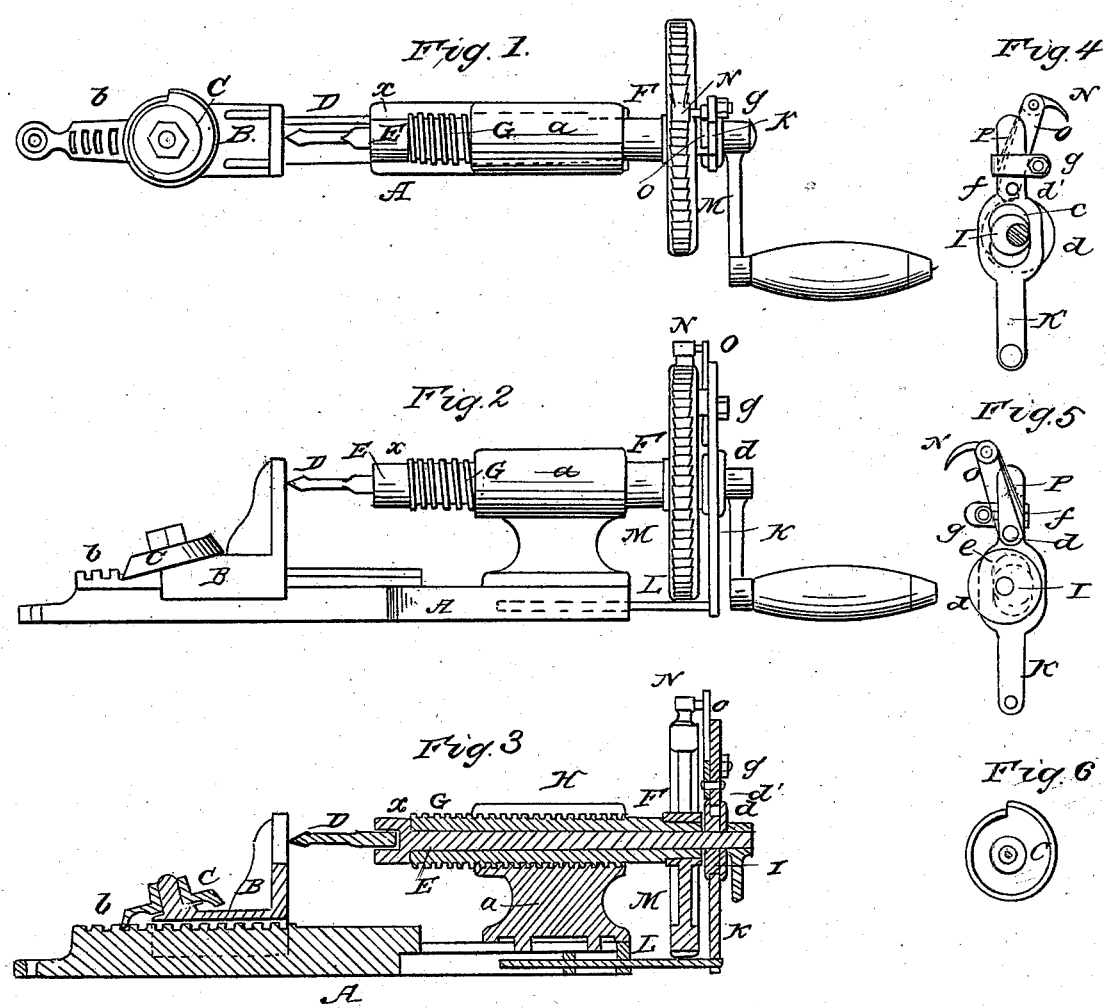

UNITED STATES PATENT OFFICE.

GEORGE C. TAFT, OF WORCESTER, MASSACHUSETTS, ASSIGNOR TO HENRY W. MASON.

FEEDING DRILL-SHAFTS.

Specification of Letters Patent No. 16,900, dated March 24, 1857.

*To all whom it may concern:*

Be it known that I, GEORGE C. TAFT, of Worcester, in the county of Worcester and State of Massachusetts, have invented an Improved Drill-Shaft-Feeding Apparatus; and I do hereby declare that the same is fully described and represented in the following specification and the accompanying drawings, in which—

Figure 1, is a top view of a drill frame, and drill having my improvement applied thereto. Fig. 2, is a side elevation of the same. Fig. 3, is a vertical, central and longitudinal section of such. Fig. 4, is a sectional view of the vibrator and the cam, applied to the drill shaft. Fig. 5, is an inner side view of said vibrator and its secondary lever the whole to be hereinafter described.

In these drawings, A, denotes the drill frame, it being constructed with a stationary standard or puppet, $a$, and a toothed rack, $b$, arranged upon it as shown in the drawings. A, bearing carriage, B, is adapted to the frame A, so as to slide longitudinally thereon and over the rack, $b$, such carriage being provided with a scroll wheel, C, arranged to work in the rack and formed as shown in underside view, in Fig. 6. This scroll wheel, when turned around or revolved in one direction, will so act between the teeth of the rack as to move the carriage, B, toward the drill, D. When turned in the opposite direction, a reverse motion of the carriage will take place. This said carriage may be adjusted at any desirable position or distance from the drill to enable such carriage to serve as a rest or support to any article to be drilled.

The drill, D, is fixed upon one end of a holder or shaft E, which is formed and extends through a tubular shaft, F, that passes through the standard, $a$, and is provided with a male screw, G, adapted to a female screw, H, formed in the said standard and arranged therein as shown in Fig. 3. By revolving the shaft, F, the said screws will impart to said shaft a movement lengthwise, whereby by acting against a shoulder, $x$, on the drill shaft, a corresponding longitudinal movement will be produced in the drill shaft. Near its outer end, the said drill shaft is provided with an eccentric or cam, I, which operates within and against the opposite sides of a recess, $c$, of a vibratory lever, K, which is arranged as shown in the drawings and between shoulder plates, $d, d$, affixed to the drill shaft. The lower end of said vibrator is affixed to a sliding rocker shaft, L, which is adapted to the frame, A, so as to slide longitudinally and be capable of being turned transversely. By such a method of applying the vibrator to the frame, A, and the drill shaft, such vibrator is caused to move with the drill shaft during and in correspondence with its longitudinal motions.

A ratchet, M, is fixed on the tubular shaft F, near to the vibrator lever before specified; an impelling pawl N, extending from said vibrator or a lever, O, attached thereto, being made to work in the teeth of the ratchet. The lever, O, turns at its lower end, on a fulcrum or pin, $d'$, extending from the inner side of the vibrator lever, a spring, P, affixed to the secondary lever being made to rest against a projection, $f$, of the vibrator. The vibrator also carries an adjustable stop, $g$, arranged as shown in Fig. 5, the same being employed for the purpose of arresting the forward motion of the secondary lever, relatively to the vibrator.

When the drill shaft is put in revolution, a reciprocating vibratory movement will be imparted to the lever K, whereby the ratchet wheel, and of course, the tubular shaft, F, will have an intermittent rotary motion imparted to them, the same being effected by the action of the pawl on the ratchet. This, in consequence of the mode of applying the pawl to the vibrator, (viz. by a secondary lever and spring) will produce a feeding movement of the drill, such as will cause it to advance into the piece of work in proportion to its ability to enter the same.

The purpose of the secondary lever and spring is to keep the drill close up to the work, and prevent overstraining or breakage of the screw threads or the vibrator lever. While, the vibrator has a positive motion invariable in its extent, the secondary lever and its spring during the movements of said vibrator lever will cause the pawl to turn the ratchet far enough to advance the drill in proportion to its ability to bore the work, the spring permitting the vibrator to continue its advance or forward movement without danger of being strained or broken by the pressure of the cam.

I claim—

Combining the pawl with the vibrator lever by a secondary lever and spring applied to them substantially in manner and for the purpose as specified.

In testimony whereof, I have hereunto set my signature this sixteenth day of October A. D. 1856.

GEO. C. TAFT.

Witnesses:
HENRY W. MASON,
WM. GREENLEAF.